May 24, 1927.
A. H. TAYLOR
1,630,227
APPARATUS FOR RECORDING ELECTRICAL SIGNALS
Filed Jan. 2, 1924
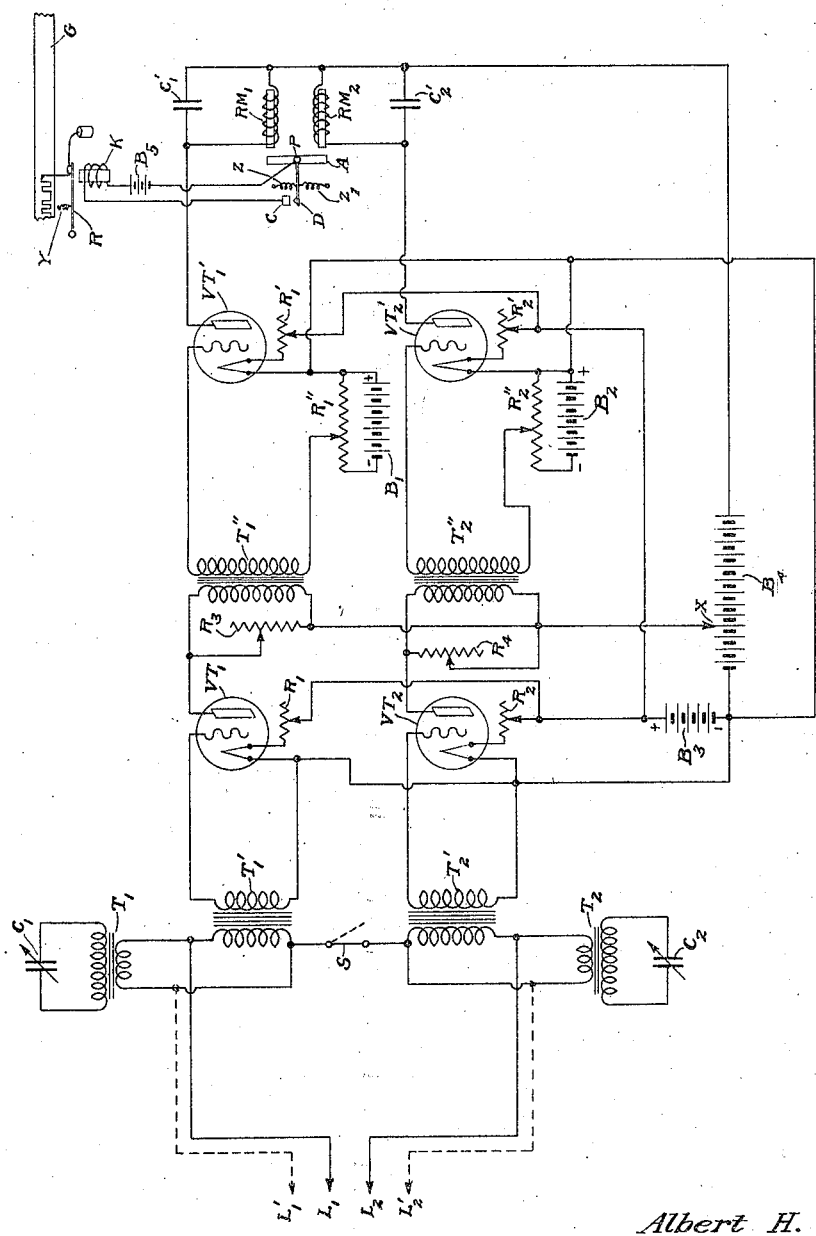
Inventor
Albert H. Taylor
By
Attorney

Patented May 24, 1927.

UNITED STATES PATENT OFFICE.

ALBERT H. TAYLOR, OF WASHINGTON, DISTRICT OF COLUMBIA.

APPARATUS FOR RECORDING ELECTRICAL SIGNALS.

Application filed January 2, 1924. Serial No. 683,928.

While my invention relates generally to making a record of signals transmitted through the medium of electrical impulses, it has for a particular object the successful recording of signals composed of groups of periodical electrical currents in the presence of varying electrical currents of an interfering nature, such as radio signals in the presence of so-called static interference or other undesirable disturbances.

Many attempts have been made to clarify electrical signals in the presence of interfering impulses by obtaining in various ways two components of signal current and interfering current such that there is a difference between the ratios of signal current to interfering current in the two components, and by bringing these two different ratios of signal to interfering current to bear upon a responsive device, such as a telephone, to balance out the interfering current leaving a responsive unbalanced signal current due to the difference between the ratios. These attempts have been made with little or no success because of having been made with telephone or like devices capable of responding to each cycle or variation of the currents, and therefore record or respond to all differences in phase between the variations of the two components of currents under attempted balance or neutralization.

I have found much more satisfactory balance or neutralization is obtained by bringing the currents to bear upon a device so low in period compared to the periods of the currents under balance that the device will not effectively respond to a single variation or cycle, but requires the integration or adding together of the energy of a plurality of the variations or cycles of the current. By employing such a device the phase differences in the variations of the two components do not produce effective responses, and where the movement of the responsive device depends upon the energy of an integrated plurality of the variations, phase differences are eliminated, and whether or not the device responds depends upon the resultant integration bringing about equal or unequal opposing efforts.

As an example of the theory on which I base the success of my system let it be supposed that it is desired to receive signals of a radio nature, composed of very high frequency oscillations broken up into groups of 800 per second, and that a number of these groups are utilized to make dots and dashes in the Morse system of signaling. Further suppose that these signal currents are interfered with by electrical impulses created in the atmosphere or otherwise, known as static, and that these interferences are quite strong, even three to four times the strength of the desired signal currents. If a telephone is inserted in the receiving system for the signal currents it will not respond to each cycle of the very high frequency oscillations, but, telephones being of sufficiently high period, it will respond to each group of the 800 groups per second into which the high frequency oscillations are broken, provided the high frequency oscillations are rectified so that only one half of the cyclic energy acts on the diaphragm. At the same time the receiver for the signal currents will receive the static currents, and we know from experience that these static currents also have group frequencies within the responsive range of the telephone, and the telephone will therefore respond to these group frequencies of the interfering static currents, as the same rectifier which rectifies the signal current also rectifies the static current. These group frequencies of the static currents have no regular period such as the 800 per second of which the signal currents may be composed by proper design of the transmitter and, therefore, have been impossible to eliminate by well known methods of tuning, filtering and trapping of periodical electrical currents. Now if it is attempted to eliminate or neutralize the effects of these static currents upon the telephone diaphragm by bringing to bear a second component of static currents of like characteristics but in an opposed sense, such component being free from signal currents or having signal currents of lesser strength due to tuned methods of receiving or other methods of eliminating periodical currents, it will be found that the second component of static currents will differ in phases of variations, and possibly amplitude of variations in phase, from the component which is associated with the signal current, and it will be found that the telephone, due to its ability to respond to each cycle of such variations, will be effectively agitated by these differences, so much so that investigators in this art have heretofore failed to discover any substantial difference between static interference when so balanced and when not balanced. On the other hand I have found that under the unfavorable conditions pointed out signals recorded on a tape with my balanced arrangements were 95 to 100 per cent readable when the same signals recorded in the unbalanced manner could not be read at all. A good operator can ordinarily receive aurally complete messages when the static is about twice as strong as the signals, assuming the signal note is of a musical tone, for instance, about 800 per second. When the static becomes three to four times as strong as the signal aural reception usually becomes impossible. I have successfully recorded signals, 95 to 100 per cent readable, with my system of balancing when the static interference was four times as strong as the signaling.

My invention will be best understood by reference to the figure of the accompanying drawing, in which I illustrate a balancing system which may be connected to any source of signal currents which have associated therewith undesirable interfering currents. In general the system is divided into two like paths or circuits into which the currents are introduced, the two paths being brought together in the electro-magnetic system of a recorder relay whose response, either mechanical or electrical, or a combination of both, is sufficiently slow to require for motion an integration of a number of cycles or variations of like kind, and arranged to oppose the resulting mechanical efforts of the interfering currents. $L_1$ and $L_2$, shown in full lines, represent leads or wires from a receiver or other source of signaling currents associated with interfering currents, as for instance, a radio receiver. With the switch S closed, as shown by the full lines, these currents are impressed simultaneously upon the circuits containing the primary of the transformers $T_1$ and $T_1'$ in one of the paths and the primary of the transformer $T_2$ and $T_2'$ in the other path. These circuits have coupled to them filters or traps including variable condensers $C_1$ and $C_2$, the transformers $T_1$ and $T_2$ being preferably step-up transformers, I have used ratios of 1 to 10. The transformers $T_1'$ and $T_2'$ pass the currents into the separated vacuum tube amplifiers $VT_1$ and $VT_2$. From these amplifiers the currents pass through transformers $T_1''$ and $T_2''$ to the vacuum tubes $VT_1'$ and $VT_2'$. The plate circuit of vacuum tube $VT_1'$ contains electro-magnetic winding $RM_1$ and of vacuum tube $VT_2'$ contains electro-magnetic winding $RM_2$. The battery $B_4$ supplies the plate circuit energy for both of these vacuum tubes. The grid or input circuits of these tubes contain battery $B_1$ and $B_2$ respectively having potentiometers $R_1''$ and $R_2''$ for accurately obtaining a negative potential or bias on the grids of the tubes, preferably adjusted to the point where no current flows in either one of the plate circuits of the tubes when no currents are being received. When currents are received the positive variation will reduce the negative bias of the grids and allow plate currents to flow, while the negative variation of the currents will increase the negative bias of the grids still further preventing plate current flow during this phase or half period. This amounts to a rectification of the currents. The electromagnets $RM_1$ and $RM_2$ are so wound that the plate currents from the two tubes create magnetic fields which act oppositely on the armature A pivoted at P. The rheostats $R_1$, $R_2$, $R_1'$ and $R_2'$, provide for controlling the amount of heating current through the filaments of their respective vacuum tubes, the heating currents being supplied from the battery $B_3$. The plate circuit energy of the vacuum tubes $VT_1$ and $VT_2$ is obtained through a variable connection X to the battery $B_4$.

By varying the condensers $C_1$ and $C_2$ the circuits containing these elements can be thrown in or out of tune with the desired signaling currents, and if one of the circuits is closely in tune with signal currents while the other is materially out of tune, the signal currents will be trapped or filtered out of the path containing the tuned circuit and will be permitted to enter the path containing the detuned circuit. At the same time the interfering currents, not generally being of a fixed frequency, will not be stopped by the tuning of the filtered circuits and will enter both paths with substantially the same amplitude and characteristics. These currents will then follow the two paths, one having signal and interfering currents associated and the other having practically only interfering currents, will be rectified in the vacuum tubes $VT_1'$ and $VT_2'$, and delivered to the electromagnetic windings $RM_1$ and $RM_2$ as a rapid succession of one way impulses of plate currents representative of the one half cycles or variations of the original current. If the armature A of the recorder relay together with its contactor D and other appurtenances, be made sufficiently low in period compared with the period or rapidity of variation of the incoming currents, then it will not be responsive to each variation but will require the integration of the energy of a plurality of the variations to cause mechanical motion thereof or mechanical effort to create motion. This action may be enhanced or made more positive by electrical tuning, as by making the period of the relay magnets $RM_1$ and $RM_2$ low, preferably accomplished by condensers $C_1'$ and $C_2'$ of large capacity being placed in shunt with the windings. With ordinary commercial windings I have found capacities of from 1 to 3 microfarads give sufficiently low periods to be of material assistance in obtaining satisfactory integration. While a relatively mechanically rapid relay may be used with a very slow electrical tuning, I find it preferable to rely upon a combination of both for best results.

The springs Z and $Z_1$ return the armature A to normal position with contacts D and C open when no signal currents are flowing. When signal currents cause these contacts to close the battery $B_5$ energizes the electromagnet K to operate the recorder arm R to make signals on a moving tape G as indicated in the drawing. The record may be made on the tape G in any suitable manner such as an ink pen attached to the recorder arm R. The spring Y cooperates in the operation of the recorder arm R.

I find it desirable to increase the power or capacity of vacuum tubes used in series or cascade arrangement in order that the succeeding tubes may have sufficient capacity not to be blocked or paralyzed by the amplified currents from the preceding tubes. This accounts for my showing the entire battery $B_4$ used to excite the plate circuits of the vacuum tubes $VT_1'$ and $VT_2'$ while only a portion of this battery potential is employed in the plate circuits of vacuum tube $VT_1$ and $VT_2$.

I have also shown my system arranged to have delivered to it currents from two sources such as two radio receivers, in one of which receivers the signal currents are strong though associated with interfering currents due to the receiver being placed closely in tune with the incoming signals, while the other receiver has practically no signal or weak signal due to being out of tune with the incoming signal, but strong in interfering currents not subject to elimination through tuning. By connecting one of these receivers to the wires or leads $L_1$ and $L_1'$ (shown in dotted lines), and the other receivers to leads $L_2$ and $L_2'$ (shown in dotted lines) and opening the switch S (as illustrated in dotted lines), the currents are set up in the two paths. With this arrangement it is not necessary to use the filter circuits containing condensers $C_1$ and $C_2$ unless it is not possible to reduce the signal current in the detuned receiver to the extent desired, when further elimination may be obtained by filtering with the filter circuits. This latter method of obtaining two components of currents through the use of two receivers has the disadvantage that it occupies two frequencies and may be subject to interference from a periodical current signal being transmitted on the second frequency.

I also find it desirable to include means for controlling the amplitudes of the currents in the two paths, particularly for the purpose of delivering to the relay for integration the same amount of energy of interfering currents from each path. This control I obtain through variable resistances $R_3$ and $R_4$ in shunt with the primaries of transformers $T_1''$ and $T_2''$. Since the impedances of these transformers are high the resistances must be high in order to obtain a control of the energy rather than a large loss. There are obviously other means known to those skilled in the art for obtaining a control of this kind.

Having described my invention I claim:

1. In a system for recording signals composed of periodical electrical currents in the presence of varying electrical currents of an interfering nature the combination of means for separating the currents into two components one of which has the signal and interfering currents in association and the other comprising substantially only interfering currents, means for rectifying the currents, shunt connected means for independently controlling the amplitude of the two components, means for integrating the energy of a plurality of the rectified cycles and variations of said currents into one-way mechanical efforts, said means being adapted to oppose the efforts resulting from the separated interfering currents, and means for utilizing the resulting unopposed effort of said signal currents to record signals.

2. In a system for recording signals composed of periodical electrical currents in the presence of varying electrical currents of an interfering nature the combination of two electrical circuits, means for introducing the currents into said circuits, means in one of said circuits for filtering out the signal currents, means in both of said circuits for rectifying the currents, a device for receiving the rectified currents from said circuits and integrating a plurality of the rectified cycles and variations into one-way mechanical efforts, shunt connected means for controlling the amplitude of the currents in each of said circuits, and adapted to oppose the efforts due to the interfering currents, and means for utilizing the effort due to the unfiltered signal currents to record signals.

3. In a system for recording signals composed of periodical electrical currents in the presence of varying electrical currents of an interfering nature the combination of a circuit containing said currents in association, a parallel circuit containing substantially only interfering currents of like characteristics to the interfering currents in said first circuit, means in both circuits for rectifying the currents, shunt connected means for adjusting the amplitude of the currents in both circuits, and a relay into which all of the rectified currents are delivered having an armature of period sufficiently low with respect to the periods of said currents to integrate the energy of a plurality of the cycles into one-way mechanical efforts and adapted to oppose the efforts of the interfering currents.

4. A relay system comprising a plurality of electron tube circuits each having input and output circuits, an audio frequency signal input circuit independently coupled to each of said first mentioned input circuits, an adjustable resistor connected in shunt with each of said output circuits, a rectifier connected to each of said output circuits, a differential relay having a pair of windings and a connection between each of said rectifiers and one of said windings of said differential relay, and means coupled to each of said first mentioned input circuits for selectively receiving a desired frequency while excluding other frequencies.

5. A relay recorder system comprising an audio frequency signal receiving circuit, a pair of audio frequency transformers each having primary and secondary windings, with the primary windings thereof connected in series in said audio frequency signal receiving circuit, and having the secondary winds thereof connected to separate branch circuits, a differential relay having a pair of windings and connections between each of said windings and said branch circuits, and tunable step up transformer circuits connected in shunt with each of said primary windings for selectively adjusting said relay recorder system to respond to a particular frequency while excluding other frequencies.

6. A relay recorder system comprising an audio frequency signal receiving circuit, a pair of audio frequency transformers each having primary and secondary windings, with the primary windings thereof connected in series in said audio frequency signal receiving circuit, and having the secondary windings thereof connected to separate branch circuits, an independent electron tube amplifier in each of said branch circuits, separate electron tube detectors connected to each of said amplifiers, a differential relay having a pair of windings, a connection between each of said detectors and one of said windings, means connected in shunt with each of said amplifiers for controlling the amplitude of the signaling energy supplied to said detectors, and means connected in shunt with each of said primary windings for selectively receiving signaling energy at one frequency while excluding signaling energy at other frequencies for actuating said differential relay.

ALBERT H. TAYLOR.